Aug. 28, 1945. DE SOTO E. RICHARDSON 2,383,814
APPLE SLICER
Filed Sept. 24, 1943  2 Sheets-Sheet 2
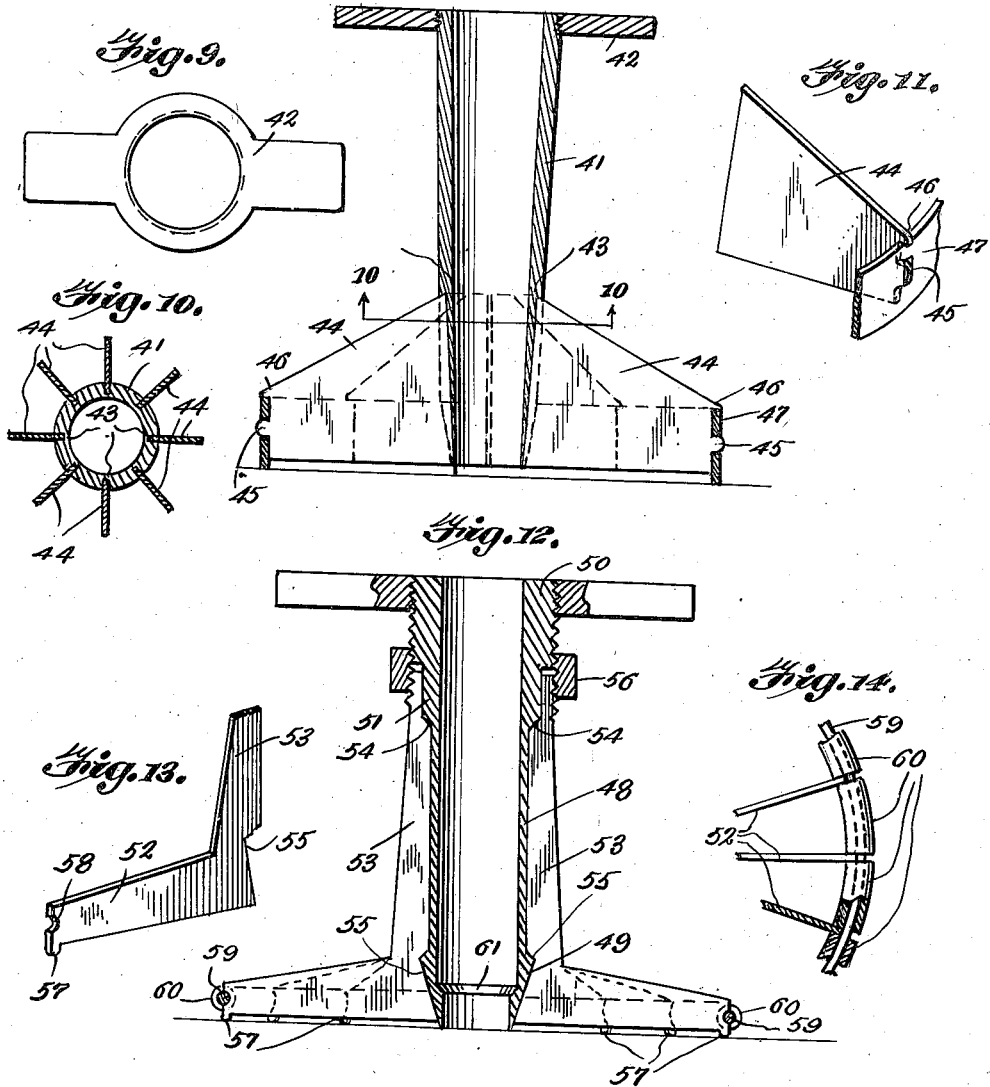

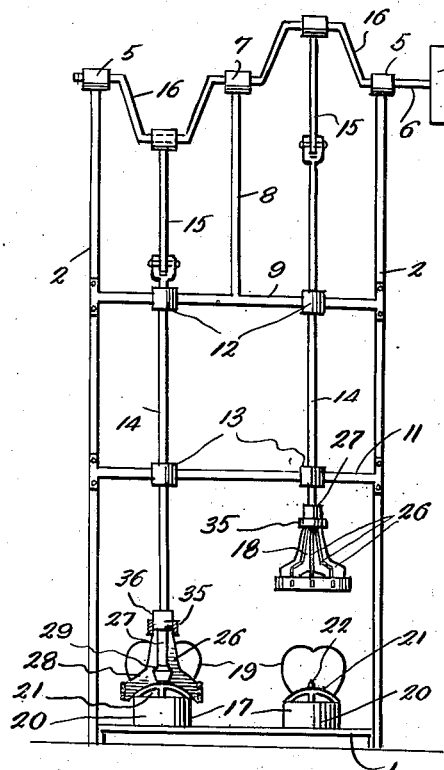

Patented Aug. 28, 1945

2,383,814

UNITED STATES PATENT OFFICE 2,383,814

APPLE SLICER

De Soto E. Richardson, Wenatchee, Wash.

Application September 24, 1943, Serial No. 503,705

6 Claims. (Cl. 30—302)

This invention relates to an apple slicer and it is one object of the invention to provide a device of this character which is adapted for cutting apples into segments for use when making pies, the device having an improved arrangement of knives which may be forced through an apple and quickly cut the same into segments of equal size and shape.

Another object of the invention is to provide a plurality of knives which are disposed in a carrier radially thereof and so mounted that while they will be firmly held in place during use they may be easily removed for thorough cleaning of the knives and the carrier.

Another object of the invention is to so arrange the blades and the carrier that by applying downward pressure the blades may be forced through an apple resting upon a base or support including a spike for passing vertically through the apple and holding it against transverse movement on the base out of its proper position under the cutter.

Another object of the invention is to provide a slicer which may be power operated in one embodiment of the invention, or hand operated when intended for use as a kitchen implement or in a small bakery.

In the accompanying drawings.

Fig. 1 is a front view of a power operated apple slicer.

Fig. 2 is a side elevation thereof.

Fig. 3 is a view looking down on the spike which holds an apple upon the base.

Fig. 3a is a perspective view of the upper end of the spike.

Fig. 4 is a view showing a hand operated slicer partially in vertical section and partially in elevation.

Fig. 5 is a view on the line 5—5 of Fig. 4.

Fig. 6 is a view looking down on the base of the slicer.

Fig. 7 is a perspective view of one of the blades.

Fig. 8 is a view showing a hand operated coring and slicing device of modified construction.

Fig. 9 is a view of the handle of the modified form of slicer.

Fig. 10 is a fragmentary sectional view on the line 10—10 of Fig. 8.

Fig. 11 is a perspective view of one of the blades.

Fig. 12 is a sectional view taken vertically through another form of corer and slicer.

Fig. 13 is a perspective view of a blade of the form of the device shown in Fig. 12.

Fig. 14 is a fragmentary view showing several of the blades and a portion of the securing wire.

Fig. 15 is a perspective view showing the outer end of one blade and a fragment of the securing wire.

The power operated slicing machine shown in Figs. 1 and 2, has a platform 1 to which are secured lower ends of front and rear uprights 2 and 3 and through upper ends of these uprights are mounted rods or bars 4 which project forwardly from the front uprights and, at their front ends, carry bearings 5 through which a crank shaft 6 is rotatably mounted. This crank shaft is also rotatably mounted through a bearing 7 at the upper end of a standard 8 carried by a cross bar 9 secured at its ends to the front uprights 2. The crank shaft is driven by a belt trained about a pulley 10, it being understood that other drive means for the crank shaft may be provided if desired. A second cross bar 11 is mounted between the front uprights and the two cross bars carry bearings 12 and 13 through which plungers or rods 14 are slidably mounted for vertical reciprocating movement. The plungers project above and below the cross bars and, at their upper ends, are pivoted to links or pitman rods 15 which have their upper ends journaled about cranks 16 of the crank shaft 6 and impart reciprocating movement to the plungers as the crank shaft rotates. Holders 17 rest upon the platform 1 under the cutters in axial alinement with the rods or plungers and each plunger carries a cutter 18 adapted to engage an apple 19 resting upon the holder over which it operates.

Each holder has a base 20 formed of metal and including a hollow body which is open at its top and carries a spider 21 from the center of which projects a prong 22 having a tapered star-shaped upper end 23, shown clearly in Fig. 3. By so forming the prong, it may be easily embedded in the apple and, as the companion cutter is shifted downwardly, its blades will cut through the apple and divide said apple into a plurality of segments. Any seeds or portions of apple cores which fall into the hollow body of the support may be dumped out of same or pass on through to running canvas below. Since the support or holder is removable from the platform, it may be thoroughly cleaned after the machine has been in use.

The holder of the hand operated device shown in Fig. 4 is of the same construction as that of the power operated machine except that the prong 22 carried by the spider 24 at the top of its hollow body 25 is of greater length than the prong 22 and will entirely penetrate the apple very easily since it is of the same shape as the prong 22 shown in Figs. 1, 2 and 3 from the spider 24 to its upper end.

The cutters 18 of the power operated machine are of duplicate construction and each of substantially the same formation as the cutter of the hand operated device shown in Figs. 4 and 5. Referring to these figures, it will be seen that the cutter has a plurality of knives or blades 26 which are sharpened along their lower edges and extend radially from vertically disposed tube or sleeve 27. The tube has a downwardly tapered foot 28 at its lower end about the upper end of which is formed a shoulder 29 and the shank 30 of each blade has the lower portion of its inner edge cut to form a notch or recess 31 so that when the blades are applied with their shanks disposed against the tube, the foot will engage in the recesses and brace the blades against movement logitudinally of the tube. Upper ends of the shanks are also formed with recesses 32 to receive the annular shoulder 33 formed by a thickened portion of the tube and outer edges of upper ends of the shanks are formed with threads 34 for engagement by internal threads of the nut 35 which is carried by the threaded collar 36 of the tube. A ring or band 37, formed of stiff metal, surrounds outer ends of the blades and is formed with openings spaced from each other circumferentially to and disposed in position to receive tongues 38 at ends of the blades. When the blades are applied, their tongues are engaged in openings of the ring and the blades then tilted inwardly until their shanks are disposed against the tube with the foot 28 and the shoulder 33 engaged in recesses 31 and 32 of the shanks. The nut is screwed downwardly into engagement with threaded upper ends of the shanks and the blades will be firmly held in place and, when the cutter is thrust downwardly, an apple under the cutter will be cut into segments by the sharpened lower edges of the blades. The cutters of the power operated machine have upper ends of their tubes screwed upon or otherwise secured to lower ends of the plungers 14 and the hand operated cutter has the upper end of its tube externally threaded and screwed into the socket 39 of a handle 40 so that, by grasping the handle, the tube may be thrust downwardly along the spike or prong and an apple cut into segments.

In Figs. 8 through 11, there has been illustrated a modified form of hand operated cutter which also serves to remove the core of an apple. In this embodiment of the invention, the tube 41 of the cutter tapers toward its lower end and, at its upper end, is externally threaded to receive a handle 42 which projects from opposite sides of the tube. Grooves 43 are formed in the lower end portion of the tube in spaced relation to each other circumferentially thereof to receive inner ends of blades 44 which project radially from the tube. These blades are sharpened along their lower edges and have sloping upper edges so that they taper toward their outer ends which are formed with tongues 45 and lugs 46, and, referring to Figs. 8 and 11, it will be seen that when the blades are applied to the ring or band 47, the tongues engage in openings spaced from each other circumferentially of the band, while the lugs 46 bear against the upper edge of the band. The lower edge portion of the band projects downwardly from lower edges of the blades and prevents the blades from being dulled if the device is placed upon a hard surface. As the implement is thrust downwardly, the blades will cut an apple into segments and the core of the apple will be cut out by the tube. Since the tube gradually increases in diameter toward its upper end, the core will be loose in the tube and may be easily dumped therefrom when the device is inverted and shaken.

In Figs. 12 through 15, another form of hand operated implement has been illustrated. The tube 48 of this device is similar to tube 27 and has a downwardly tapered foot 49 at its lower end and a threaded collar 50 about its upper end below which is an annular shoulder 51. The blades 52 extend radially from the tube and have upstanding arms 53 provided with upper and lower recesses 54 and 55 for receiving the shoulder 51, and the foot 49. A nut 56 is screwed upon the collar 50 and, when it is shifted downwardly into engagement with the threaded upper ends of the arms 53, the arms will be held against the tube. At their outer ends, the blades are formed with depending lugs 57 to rest upon a hard surface and prevent dulling of the sharpened lower edges of the blades and outer ends of the blades are also formed with notches 58 to receive a binding wire or ring 59 which surrounds the blades and carries spacers 60 for holding the blades spaced from each other circumferentially of the ring. During use of this device, the core will be removed from an apple at the same time the apple is cut into segments and, since the tube is formed with an internal ledge or shoulder 61, the core will be taken up with the device and the device may then be inverted and the core shaken from the tube.

It should also be noted that since the interior of the tube is of greater internal diameter above the shoulder 61 than below the shoulder, therefore, after the core of an apple has moved upwardly through the tube to a position above said shoulder, it can easily slide through and out of the tube.

Having thus described the invention, what I claim is:

1. In a slicing device, a tube having its lower portion enlarged to form a foot projecting radially therefrom, a collar about the upper portion of said tube, an annular shoulder about said tube under said collar, blades disposed radially of said tube and having portions at their inner ends bearing against the tube and formed with recesses receiving portions of the foot and the shoulder, a ring surrounding said blades and formed with seats, said blades having portions at their outer ends engaged in said seats, and a nut screwed upon said collar and having threaded engagement with upper ends of inner portions of the blades to firmly hold the blades against the tube.

2. In a slicer, a tube having annular shoulders about its upper and lower portions, blades disposed radially of said tube in spaced relation to each other circumferentially thereof, upstanding shanks at inner ends of said blades bearing against said tube and formed with recesses receiving said shoulders, a ring surrounding said blades and interlocked with outer ends of the blades, and a nut threaded upon said tube above the shanks and movable downwardly into position for engaging about upper ends of the shanks and holding the same firmly against the tube.

3. In a slicer, a tube tapered toward its lower end to form the tube with a core-receiving chamber gradually increasing in diameter toward its upper end, blades disposed radially of said tube with their inner ends engaged in seats spaced from each other circumferentially of the tube, a ring surrounding said blades with portions of outer ends of the blades resting upon the upper edge of the ring, and tongues at outer ends of the blades passing through said ring to anchor the blades to the ring.

4. In a slicer, a tube formed with an internal annular shoulder spaced upwardly from the lower end of the tube, the portion of the tube above the shoulder being of greater internal diameter than the portion of the tube below the shoulder, blades disposed radially of said tube and having shanks at their inner ends extending upwardly and bearing against the tube in spaced relation to each other circumferentially thereof, means carried by said tube for engaging the shanks of said blades and bracing same against movement longitudinally thereof, a fastener adjustably carried by said tube and releasably engaging the shanks to firmly hold same against the tube, a ring surrounding said blades, outer ends of the blades being formed with recesses receiving said ring to hold the ring in place, and spacers upon said ring disposed between the blades for holding the outer ends of the blades spaced from each other circumferentially of the ring.

5. In a slicer, a tube open at its upper and lower ends and being of reduced internal diameter at its lower end, blades spaced from each other circumferentially of said tube and extending radially therefrom, inner ends of said blades being detachably engaged with said tube, a ring surrounding outer ends of said blades and formed with seats removably receiving outer ends of the blades, and a handle threaded on the upper end of said tube.

6. In a slicer, a tube open at its upper and lower ends and sharpened about its lower end, blades spaced from each other circumferentially of said tube and extending radially therefrom, a ring about outer ends of said blades detachably engaged by the blades, shanks extending upwardly from inner ends of said blades and along said tube and interengaged therewith to prevent movement longitudinally of the tube, and a fastener surrounding said tube and engaged about upper end portions of the shanks to bind the shanks to the tube.

DE SOTO E. RICHARDSON.